Oct. 13, 1964    B. NATHAN ETAL    3,152,948
ORNAMENTAL MIRRORS AND METHOD OF MAKING SAME
Filed Aug. 10, 1959

Inventors.
Bernard Nathan, &
George A. Russ.
By Byron Hume Erven Clement
Attys.

3,152,948
ORNAMENTAL MIRRORS AND METHOD OF MAKING SAME

Bernard Nathan, Lincolnwood, and George A. Russ, Glenview, Ill., assignors, by mesne assignments, to The American Securit Company, Wilmington, Del., a corporation of Delaware
Filed Aug. 10, 1959, Ser. No. 832,618
6 Claims. (Cl. 161—4)

Our invention relates to ornamental mirrors and method of making same and has particular reference to ornamented or decorated mirrors having designs of various types and kinds thereon and which may consist of marginal decorations, corner decorations or the like, for mirrors designed primarily for functional purposes, or mirrors made for decorative purposes alone and in which the major portion of the surface of the mirror is covered with ornamental designs for added attractiveness of the mirror.

Another and further object of our invention is the provision of a mirror having a design thereon in which the figure constituting the design appears in the form of hammered material preferably simulated hammered silver because of the use of a silvered light reflecting coating applied over the design on the reverse side of a mirror glass.

Another and further object of our invention is the production of an ornamental or decorative mirror in which the decorative means is light reflecting from the reverse or rear side of the mirror in which rays of light passing through the glass will be reflected back from the decorative material forming the decorations and through the glass forming the mirror so the reflecting material is sealed to the reverse surface of the glass and cannot be marred when the face of the mirror is cleaned or dirt removed therefrom.

Another and further object of our invention is the provision of a decorative mirror in which a three-dimensional effect is produced in a simpler and less expensive manner than it has been able to produce such mirrors by the methods heretofore employed.

Another and further object of our invention is the provision of a mirror having decorative patterns on the reverse side thereof which are so treated that the usual reflective silvering normally applied to the reverse side of a mirror will adhere to and be firmly attached to the material forming the decorative pattern as well as to the surface of the glass.

These and other objects of our invention will be more fully and better understood by reference to the accompanying sheet of drawings and in which—

Figure 1:
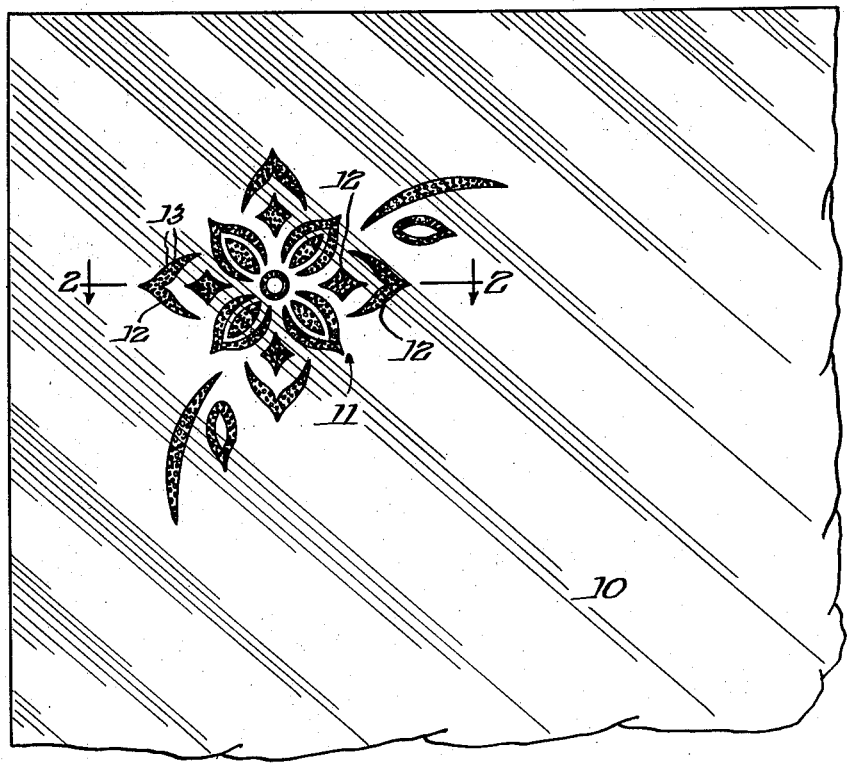
FIGURE 1 is an elevational view of the face of a section of mirror having decorative material applied to the reverse side thereof.
Figure 2:
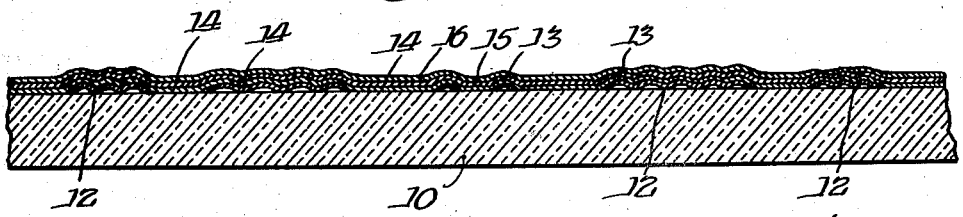
FIGURE 2 is a sectional view taken on lines 2—2 of FIGURE 1 showing the glass section and the various layers of backing applied to the reverse surface of the glass.

Referring now specifically to the drawings and in which like reference characters refer to like parts throughout, a sheet of glass 10 is shown which has a decorative pattern 11 applied thereto, consisting of a plurality of configurations 12, 12 of various forms and in which the form shown may consist of a floral design placed in the corner of a mirror for decorative purposes or may extend around the border of the mirror if desired or, if the mirror is for ornamental purposes alone, may be applied in a substantial all-over design to the reverse side of the mirror in which case the mirror would be rendered substantially non-functional because of its inability to reflect clearly the image of an object appearing before it, such as a person looking into the glass or the like.

The ornamental design 11 is produced in the form of a coating consisting of two crystal clear transparent dissimilar resin varnishes, one of which should be a styrenated alkyd resin varnish, such as Reichhold Chemical Company's #4252 Styresol which is a styrene, or a substituted styrene-alkyd, or American Cyanamid Company's Cycopol #101–1 which is a styrene, or a substituted styrene-alkyd resin varnish, while the other should be a pure phenolic type of resin varnish such as Reichhold Chemical Company's #1001 Super Backacite or Bakelite Corporation's BV1600 which are phenol-formaldehyde resin varnishes. These two incompatible resin varnishes, prior to being applied to the glass, are mixed together in substantially equal quantities and vigorously agitated by some form of mechanical high speed agitation so that a maximum amount of air is entrapped in the mixture in the form of tiny bubbles, which mixture is thereafter applied to the reverse side of a sheet of glass. The clear glass is prepared for such application by being washed through a conventional glass washing machine so that no grease, oil, or other foreign substance remains on the glass. The surface of the glass is allowed to dry and the varnish mixture is thereupon silk screened onto the reverse side of the clear glass in the desired design, for example a floral design, to cover the areas of the glass forming the design, or as much area of the glass surface as it may be desired to ornament, and thereafter the coating thus applied in the desired design is dried thoroughly.

During the high speed agitation of the two kinds of varnishes, air is entrapped in the mixture in the form of tiny bubbles 13, 13 and as the mixture is silk screened onto the surface of the glass these tiny bubbles 13, 13 remain in the mixture so that when the mixture is applied to, or screened upon the glass, it is in liquid form which adheres to the surface thereof in such manner that a design outline is formed, which design includes the tiny bubbles which remain intact in the silk screening process and spaced fairly uniformly over the entire design. The high speed agitation or rapid beating together of the mixture of the two varnishes is necessary to produce the very fine bubbles which in turn produce the hammered effect of the design as incorporated upon the mirror, as otherwise the bubbles are too large and too irregular in appearance in the design.

After the screening process is complete the design is then dried thoroughly, during which drying process the air escapes from the tiny bubbles 13, 13 so that the design viewed from the rear appears as a coated surface from which very small semi-spherical elevations extend, and from the front the bubbles appear as tiny concave depressions.

The next step in the process involves the silvering of the glass on which the decorative design 11 has been applied. In order to prepare the varnished surface for the silvering solution we have found it necessary to employ a non-ionic wetting agent such as Rohm & Haas Company's #X–100 alkyl aryl polyether alcohol to the usual tin chloride sensitizing solution as a wash over the surface of the decorative varnish material because the varnish repels the usual tin chloride sensitizing solution and the usual silvering solution. This tin chloride solution containing the alcohol above identified is applied by spraying the solution over the surface of the glass upon which the design appears which enables the varnish ornamentation to receive the silvering solution and produces the necessary light reflection surface of the mirror. The quantity of the alkyl aryl polyether alcohol added to the tin chloride solution is small but should not be less than 0.1%. The usual silver nitrate coating solution 14, with which a slight amount of the non-ionic wetting agent of not less than 0.1% is used, is next applied over the entire reverse surface of the glass including the decorated areas.

However, by employing the wetting agent, the sensitizing solution and the silver will cover the glass as well as the decorative design and because of the fact that the silvering solution is applied over the design, and forms a backing therefor, the face of the design reflects and diffuses rays of light through the mirror and also from the concave surfaces of the bubbles in very much the same fashion as light is reflected from hammered silver. Therefore the ornamentation through the face of the mirror presents a simulated effect of hammered silver.

After the silvering solution has been applied over the design and to the reverse side of the glass as a part of the backing for the mirror, a copper plating solution 15 is superimposed over the silver coating and thereafter a coating of paint 16 is superimposed over the copper coating to thoroughly protect the coating and also the silvering and the design coating applied to the reverse side of the mirror. After these coatings have been applied and dried, the mirrors can be appropriately framed and packed for shipment and sale as may be desired.

It will therefore be understood from the foregoing description that the novel steps in the method of making a mirror consist in the application of ornamental figures, designs and the like to the reverse side of a mirror glass, bonding the usual silvering solution over the designs and the portion of the mirror designated for functional use to provide the proper light reflecting qualities for the mirror. The particular design shown is only one of many forms which may be employed for decorating functional mirrors, but if it is desired to produce a mirror purely for decorative purposes, the decorative materials can be applied to rectangular or other areas of the glass in various geometrical type figures or other designs in sufficient number to cover substantially the entire surface of the glass.

It will also be understood that this process can be easily and cheaply carried out in the production of the mirror. The mirror has two distinctive light reflecting surfaces, one of which for functional purposes is in the usual form of a mirror. The rays of light are reflected at the same angle of incidence from the plane surface of the mirror, while light rays from the decorations somewhat diffuse, and reflect in a plurality of directions, because of the substantial semi-circular character of the reflecting surface of the small bubbles appearing upon and forming a part of the design.

While we have described more or less precisely the details of construction, we do not wish to be understood as limiting ourselves thereto, as we contemplate changes in form, the proportion of parts and the substitution of equivalents as circumstances may suggest or render expedient without departing from the spirit or scope of the invention.

What is claimed is:

1. A mirror comprising a transparent glass body, a decorative design applied to one side of the glass, the said design consisting in its essential constituents of a mixture of two non-compatible clear resin varnishes containing bubbles, a light reflecting coating applied over the design and to a part of the glass body not covered by the design, a copper coating applied over the light reflecting coating, and a protective paint coating applied over the copper coating.

2. A mirror comprising a piece of transparent glass, a decorative design applied to one side of the glass, the said design consisting in its essential constituents of a mixture of two non-compatible clear resin varnishes filled with small bubbles, a light reflecting coating applied over the design and to a part of the glass not covered by the design, and a protective coating applied over the said coating.

3. A mirror comprising a piece of transparent glass, a decorative design applied to the reverse side of the mirror, the said design consisting in its essential elements of a bubble filled mixture of two dissimilar clear resin varnishes, one of the varnishes having a styrenated alkyd resin base and the other of said varnishes having a pure phenolic resin base, a light reflecting coating applied over the design, a metallic coating over the light reflecting coating, and a paint coating over the metal coating.

4. A method of making ornamental mirrors which comprises whipping together two non-compatible clear resin varnishes until the mixture contains tiny bubbles, applying the resultant mixture to a mirror glass in a selected design and drying it, washing the design and the adjacent surface of the glass with a tin chloride sensitizing solution containing a non-ionic wetting agent, applying a silvering coating solution to the washed area, applying a copper coating over the silver coat, and applying a protective film over the copper.

5. A method of making ornamental mirrors which consists essentially in whipping together two dissimilar clear resin varnishes until the mixture is filled with small bubbles, one of said varnishes having a styrenated alkyd resin base and the other of said varnishes having a pure phenolic resin base, applying the resultant mixture to a mirror glass in a selected design form, washing the design and the adjacent glass with a tin chloride sensitizing solution containing a non-ionic wetting agent, applying a silver coating to the design and to the adjacent glass, applying a copper coating to the silver, and applying a protective coat to the copper.

6. A method of making ornamental mirrors which consists in whipping together two dissimilar clear resin varnishes until the mixture is filled with tiny bubbles, one of said varnishes belonging to a styrenated alkyd resin base, the other varnish being of a pure phenolic resin base, applying the mixture to mirror glass, drying and washing at least the design with a sensitizing solution containing a non-ionic wetting agent, applying a silvering coat to the design area and to design-free glass areas thus producing a reflective backing for bubbles contacting the glass, and applying at least one reinforcing and protective coat to the silver.

References Cited in the file of this patent

UNITED STATES PATENTS

| | | |
|---|---|---|
| 307,126 | Lloyd | Oct. 28, 1884 |
| 1,604,459 | Lyons | Oct. 26, 1926 |
| 1,943,623 | Porter | Jan. 16, 1934 |
| 1,971,261 | Harmon | Aug. 21, 1934 |
| 2,165,393 | Lilienfeld | July 11, 1939 |
| 2,757,473 | Gerlach | Aug. 7, 1956 |